United States Patent Office 2,799,705
Patented July 16, 1957

2,799,705
SUBSTITUTED SODIUM AMIDES

David O. De Pree, Royal Oak, and Eugene F. Hill, Birmingham, Mich., assignors to Ethyl Corporation, New York, N. Y., a corporation of Delaware No Drawing. Application June 28, 1954,
Serial No. 439,929

3 Claims. (Cl. 260—583)

The present invention relates to substituted sodium amides and more particularly to an improved process for their preparation.

The substituted sodium amides possess a high degree of chemical reactivity and are therefore useful as reaction intermediates and condensation catalysts. For example, these compounds catalyze the intramolecular condensation of certain nitriles. The sodium alkyl amides are also efficient catalysts for effecting the polymerization of various amines with vinyl esters. However, widespread use of these interesting compounds as well as the development of new uses has been limited by the fact that heretofore there has been no commercially attractive and satisfactory method for their preparation.

Ziegler in U. S. 2,141,058 has proposed a method for the preparation of substituted sodium and lithium amides by reacting sodium or lithium with an amine in the presence of a conjugated diolefin. However, this process has not been accepted for commercial exploitation for a number of reasons. For example, the process is unattractive since excessive quantities of diluent are required, thus adding to the cost, the product is soluble in the reaction mixture and is not readily removed therefrom, and inferior results are achieved, particularly in terms of reaction rate, when employing sodium metal rather than lithium which is the more costly of the two materials. Ziegler has shown that reaction of the amines with lithium or organo-lithium compounds in the presence of conjugated dienes and extremely high dilution is very vigorous, whereas with sodium the reaction is slow, even using finely divided sodium. At the time of Ziegler's invention, and in fact some years subsequent thereto, to the best of our knowledge finely divided sodium smaller than about 500 microns was unknown. Therefore, it appears that the high dilution of Ziegler's process was required in order to dissolve the product and prevent adherence of the product upon the larger sodium particles which would thereby inhibit or prevent the reaction from going to completion. Thus, Ziegler's process employing sodium has the uneconomical and unattractive disadvantages of requiring high dilution, longer reaction times, and difficulty of separation of the product from the reaction mixture.

Accordingly, it is an object of this invention to overcome the disadvantages of the prior art and provide an improved process for preparing substituted sodium amides. It is a further object of this invention to provide a process for preparing sodium amides by direct and vigorous reaction of sodium with an amine at temperatures below the melting point of sodium and in a manner such that the substituted sodium amide is insoluble in the reaction mixture. These and other objects of our invention will become apparent as the description proceeds and the features of novelty which characterize our invention are set forth with particularity in the claims annexed to and forming a part of this specification.

The above and other objects of our invention are accomplished by reacting a dispersion of finely divided metallic sodium with at least the chemical equivalent of an amine having at least one hydrogen atom bonded to an amino nitrogen atom in the presence of a conjugated polyene at a temperature below the melting point of sodium wherein the metallic sodium is of particle size from about 1 to 50 microns and of concentration of between about 10 and 65 percent by weight dispersed in a dispersing medium selected from the group consisting of amines and inert liquid hydrocarbons. When a hydrocarbon is employed as the dispersing medium, between about the chemical equivalent and 10 percent in excess of the amine is employed. Likewise, when employing a hydrocarbon as the dispersing medium, especially good results are obtained when the concentration of the sodium based upon the weight of the dispersing medium is between about 20 and 50 percent by weight, the particle size is less than 20 microns, and the quantity of amine is between about the chemical equivalent and 5 percent in excess. When employing an amine as the dispersing medium, the sodium is dispersed in at least the chemical equivalent amount of amine and the amine is present in amount such that the substituted sodium amide produced is insoluble in the reaction mixture. In other words, the amine is present in amount not greater than that required for the product to be insoluble but sufficient to react with all the sodium. Generally, the proportion of amine to sodium should be less than about 12 to 1 parts by weight. As in the case of a hydrocarbon dispersion, it is preferred that the concentration of the sodium in the excess amine be between about 20 and 50 percent by weight and the particle size of less than 20 microns. When employing the process of this invention, the reaction proceeds quite vigorously and the amide product forms readily as a solid material which can be separated from the reaction mixture by conventional means such as filtration or decantation. The yields obtained by the process are substantially quantitative, and yields of the order of 95 to 100 percent of theoretical are not uncommon.

Thus, our process has as a particular advantage the combination of the higher reactivity of the more finely divided sodium with the lesser dilution of the reaction mixture. The reaction proceeds vigorously and rapidly to completion without product surrounding the sodium particles. In addition to achieveing vigorous reaction when employing sodium in accordance with our invention rather than by Ziegler's technique, the economics of the process are considerably more attractive in that there is greater throughput per unit reactor volume due to our more concentrated reaction mixtures. As pointed out above, a further advantage is that by employing the more concentrated reaction mixture of this invention, the product is obtained as a solid which is readily removed from the reaction mixture. In view of the teaching of the prior art, it is unexpected that more concentrated reaction mixtures can be employed. Indeed, by our process, the sole diluent can be an excess of the amine reactant.

It has been further discovered that amines will react with solid sodium metal to form amides in excellent yield at temperatures substantially below the melting point of the sodium in a matter of minutes if the metal is in the form of the finely subdivided particles. In most cases, temperatures of the order of 30° C. and lower are employed. At these low temperatures there is little or no tendency for undesirable side reactions involving the polyene, and therefore, it is unnecessary to exercise close control over the amounts of polyene added to the reaction mixture.

In accordance with our invention, any amine having at least one replaceable hydrogen atom bonded to an amino nitrogen atom can be reacted with sodium to form the corresponding amide. Thus, any primary or secondary amine can be employed, and the hydrocarbon residue of the amine can be alkyl, aryl, or a mixture of alkyl and aryl. Cyclic and heterocyclic amines can also be successfully reacted with sodium by this process to form the corresponding amides. Typical but non-limiting examples of primary amines which can be used thus include the monoalkyl amines such as the homologous methyl, ethyl, propyl, butyl, amyl, and hexyl amines and the like up to and including amines having about 16 carbon atoms in the hydrocarbon chain. Monoalkyl amines having a branched chain structure such as isobutylamine, 3-amino-4-methylpentane, 1-aminopropane, 2-aminobutane, and the like can also be employed. Examples of secondary amines which can be used include dialkyl amines such as diethylamine, dipropylamine, dibutylamine, 2-methylaminobutane, 2-ethylaminobutane, and the like. Amines wherein the hydrocarbon residue consists of aryl groups can also be employed, and specific but non-limiting examples of such compounds include primary amines such as aniline; m-, o-, and p-aminodiphenylmethane; 1-amino-4-tert-butylbenzene; o- m-, and p-ethylaniline; p-isobutyl aniline; p-isopropyl aniline; o-, m-, and p-methyl aniline; o- and p-propyl aniline; p-phenyl aniline; 2,3,4,5-tetramethyl aniline; 2,3,4,6-tetramethyl aniline; 2,4,5-trimethyl aniline; 2,4,6-trimethyl aniline; o-, m-, and p-toluidines; anthranyl amines; benzidine; naphthylamines; amino phenanthrene; and the like. Secondary amines in which the hydrocarbon residues are aryl groups can also be used and include compounds such as the diphenyl amines, ditolyl amines, and the like. Secondary amines in which the hydrocarbon residues are a mixture of aryl and alkyl groups can also be reacted with sodium in accordance with this invention to produce the corresponding sodium amides. Examples of such alkylaryl amines include N-butyl aniline, N-ethyl aniline, N-phenyl methyl aniline, N-isoamyl aniline, N-isobutyl aniline, N-propyl aniline, N-butyl o-toluidine, N-butyl-p-toluidine, and the like. Cyclic amines such as cyclohexylamine, N-butyl cyclohexylamine, N-ethyl cyclohexyl amine, and the like can also be employed as well as heterocyclic amines such as the α-, β-, and γ-aminopyridines, aminoquinolines, aminoacridines, piperidine, aminoisoquinolines, and the like.

The substituted sodium amides are prepared in accordance with our invention by reacting an amine of the type described above with finely divided solid sodium. The sodium is utilized in the form of a dispersion or a suspension. Dispersions of alkali metals are well known in the art and, in general, are prepared by fusing an alkali metal in an inert liquid medium and subjecting the entire mixture to vigorous agitation while maintaining a temperature above the melting point of the alkali metal. The agitation serves to subdivide the alkali metal into particles varying in size from 1 up to 50 microns and to disperse these particles uniformly throughout the dispersing medium. The dispersion can then be cooled and utilized as such in our process. Although many dispersing media are known, we have found that the amines or inert hydrocarbons are best suited for our process. Examples of suitable inert hydrocarbon dispersing media include kerosene, gasoline, mineral oil, benzene, toluene, xylene, n-octane, n-decane, heavy alkylate, and the like. The amines mentioned hereinbefore can also be employed as the dispersing medium, preferably those having a boiling point above the melting point of sodium. When an amine is employed as the dispersing medium, it is preferable to employ the same amine as that with which the sodium is intended to react. Still other such dispersing media can be employed, the foregoing merely showing a representative list of those which we commonly use.

We have found that dispersions having a metal concentration of between 10 and 65 percent and preferably of between 20 to 50 percent by weight are best suited in carrying out the preparation of amides according to our invention. Likewise, the quantity of the amine should be between about the chemical equivalent and 10 percent in excess or preferably 5 percent in excess when a hydrocarbon is employed as the dispersing medium. When employing such concentrations, the product is insoluble in the reaction mixture and therefore settles out. Likewise, greater throughput per unit volume of reactor is achieved since excessive dilution of the prior art processes is not required. In conjunction with our more concentrated reaction mixture, the particle size of the sodium should be less than about 50 microns and preferably less than about 20 microns, for with these particle sizes the reaction is quite vigorous and no coating of the product surrounding the particles is achieved.

One method for carrying out the preparation of the substituted sodium amides in accordance with our invention consists of introducing a chemical equivalent amount of amine and dispersed sodium into a reaction vessel provided with a stirring mechanism. A conjugated polyene is then passed into the reaction mixture and the amide-forming reaction takes place rapidly at room temperature or lower. Since the reaction is exothermic, it is desirable in some cases to provide means for chilling the reaction vessel. Some degree of control over the reaction can also be effected by controlling the addition of the polyene. When no further reaction is indicated upon continued addition of the polyene, the substituted sodium amide which is formed as a solid product is then separated from the reaction mixture by filtration, decantation, or the like. Removal of entrained liquid on the solid product can be accomplished by volatilization. In commercial operations it is desirable to employ filtration as a means to separate and recover the amide product.

As previously indicated, one of the outstanding advantages of this process is that it is carried out at temperatures which are substantially below the melting point of sodium. Preferably, the reaction vessel is maintained at a temperature below 65° C., and the reaction has been carried out satisfactorily using temperatures as low as −20° C. Likewise, since the reaction is quite vigorous and rapid, prolonged reaction periods are not required. Reaction periods of less than about 20 minutes have been found sufficient.

The polyene which is introduced into the reaction mixture functions primarily as a hydrogen acceptor. Any polyene having conjugated double bonds can be satisfactorily employed, and typical but non-limiting examples of such polyenes thus include 1,3-butadiene; 1,3,5-hexatriene; 1,3,5,7-octatetraene; 2-methyl-1,3-butadiene; 2,3-dimethyl-1,3-butadiene; 1,3-pentadiene; 1-phenyl-1,3-butadiene; styrene; and mixtures thereof. Polyene-containing materials are frequently obtained as by-products of various processes and such are admirably suited for our process One such is that obtained in the aluminum-chloride catalyzed addition of hydrogen chloride to ethylene. This material has been referred to as "hydropolymer." Since the reaction is carried out at relatively low temperatures, close control over the amount of polyene introduced is not necessary, and amounts substantially in excess of, or less than, stoichiometric can be employed. When using less than stoichiometric amounts of polyene, however, the yield of amide is correspondingly reduced. The polyene can be introduced into the reaction mixture as a gas by means of a submerged bubble tube or, as an alternative, the polyene can be passed over the surface of the reaction mixture while the mixture is being agitated. The latter alternative is very effective in introducing the polyene since these compounds are in general very soluble in amine. This alternative is preferred since we have noticed that when utilizing a bubble tube, there is some tendency for the tube outlet to become clogged. The polyene can also be introduced into the mixture as a liquid.

It is also generally preferred to exclude air from the reaction system since it has been observed that air tends to poison and kill the reaction. For this same reason it is desirable to flush the equipment with an inert gas, such as dry nitrogen, prior to carrying out the reaction.

Another method of carrying out the reaction comprises initially dispersing the sodium metal in the amine with which the sodium is to react and thereafter introducing the polyene into the dispersion. For example, the sodium is dispersed into at least the chemical equivalent amount of the amine and the polyene is introduced into the mixture. Alternatively, the sodium is dispersed in the amine and then the polyene and the chemical equivalent of amine is added to this dispersion. Whichever procedure is followed, the concentration of the sodium in the excess amine should be such that the product is insoluble in the reaction mixture and preferably between about 20 to 50 percent by weight. One method of achieving the finely divided sodium particles dispersed in the amine is to first disperse the sodium in a hydrocarbon, remove the hydrocarbon therefrom, and then disperse the fine particles of sodium into the amine. In the case of dispersing the sodium particles in the lower boiling amines wherein the particles are not first dispersed in a hydrocarbon, pressure operation is required in forming the dispersion, and therefore this procedure is not preferred.

The following examples will serve to further illustrate our invention. The parts and percentages given in these examples are on a weight basis.

*Example I*

Sodium N-sec-butylamide was prepared by introducing 73 parts sec-butylamine and 23 parts metallic sodium of average particle size less than 10 microns and ranging from 1 to 50 microns dispersed in 135 parts n-octane into a reaction vessel equipped with means for condensing any amine that may be volatilized during the reaction, a stirring mechanism, a means for introducing liquid butadiene, and a nitrogen inlet. The vessel was flushed with pure nitrogen and placed in a Dry-Ice cooled kerosene bath. Fifty-four parts of liquid 1,3-butadiene was introduced into the reaction mixture, and the reaction was allowed to proceed for a period of 20 minutes. During this time the contents were agitated by means of the stirring device and a vigorous reaction took place. Sodium N-sec-butyl amide was formed as a white solid material. After the 20 minutes, no further reaction was apparent, and the product was then separated from the reaction mixture by volatilizing the n-octane and butene by-product under vacuum. In commercial operations the solid product is best removed by filtration and then heated to remove residual diluents, etc. A yield of 91.3 parts of sodium N-sec-butyl amide was obtained, thus representing about 96 percent of theoretical. The product was identified by first suspending it in n-octane and passing carbon dioxide through the suspension. When the evolution of heat had subsided, the mixture was filtered. The precipitate was suspended in water. Acidification caused evolution of $CO_2$ and liberation of the free amine. The liberated amine was identified by reaction with phenyl isocyanate in stoichiometric quantities producing the precipitate N-sec-butyl-N'-phenyl urea which melted at 150° C. (Beilstein 12, page 349). Analysis of the urea for carbon, hydrogen, and nitrogen showed 8.39 percent hydrogen, 69.44 percent carbon, and 14.78 percent nitrogen. This analysis corresponds to the theoretical analysis of N-sec-butyl-N'-phenyl urea which contains 8.4 percent hydrogen, 68.7 percent carbon, and 14.6 percent nitrogen.

*Example II*

Sodium N-sec-butyl amide was prepared by introducing 2 parts of a 30 percent sodium dispersion in n-octane to a reaction flask which had been flushed with pure nitrogen, and thereafter the n-octane was removed by a vacuum distillation. The particle size of the sodium was less than 20 microns. Approximately 7 parts of sec-butylamine was then added to the sodium and the mixture agitated by means of a stirring device. The reaction flask was placed in a cooling bath maintained at 0° C. While agitating the reaction mixture, 1.2 parts of gaseous 1,3-butadiene was introduced. After a period of 20 minutes the vigorous reaction had subsided, and the butadiene-butene mixture as well as the excess amine was removed by vacuum distillation, collected, and analyzed. A material balance showed that no sodium or amine was lost in the reaction, although a 12.7 percent loss of butadiene was observed. The major portion of this loss is accounted for by an increase in the weight of the free amine in which butadiene is highly soluble. A yield of 2.38 parts of sodium N-sec-butyl amide was obtained, thus representing a yield which is 93.7 percent of theoretical.

*Example III*

Sodium isopropyl amide was prepared by reacting 2.3 parts sodium dispersed in 3.45 parts kerosene with 6.2 parts of isopropyl amine. The average particle size of the sodium was less than 10 microns, with the range being 1 to 30 microns. The ingredients were placed in a reaction vessel which had previously been flushed with pure nitrogen. The vessel was provided with a stirring mechanism, a means for condensing and returning any amine that might be volatilized during the reaction, and a bubble tube for introducing gaseous butadiene. The reaction vessel was maintained at a temperature of about 35° C. Gaseous 1,3-butadiene was passed into the reaction mixture, and a vigorous reaction took place. Sodium isopropyl amide was formed as a white solid. After a period of about 25 minutes no further reaction was apparent, and the excess amine, kerosene, and butadiene-butene mixture removed from the amide product as described in the above examples.

*Example IV*

Sodium diethyl amide was prepared by reacting 3 parts of sodium, average particle size less than 10 microns, with a range of about 1 to 25 microns, dispersed in 7.5 parts of n-octane with sufficient diethyl amine to carry out the reaction. The reactants were placed in a vessel provided with a stirring mechanism and a water jacket so as to maintain a temperature of about 25° C. Gaseous 1,3-butadiene was introduced into the reaction mixture by directing the gas stream over the surface of the reactants while stirring. As in the above examples, the reaction was vigorous, and sodium diethyl amide formed readily as a solid material.

Other sodium amides can be prepared in accordance with our invention with equally good results. For example, by the processes as described in the examples, we can prepare sodium anilide, N-ethyl sodium anilide, N-isopropyl sodium anilide, o-sodium toluidide, sodium diphenylamide, 2-sodium amido pyridine, sodium cyclohexylamide, sodium piperidide, and the like from the corresponding amines. Likewise, equally good results are achieved when the finely divided alkali metal in the above and other examples is dispersed with other inert hydrocarbons as, for example, xylene, toluene, gasoline, heavy alkylate, and the like, or in the amine reactant as, for example, when preparing sodium anilide employing aniline as the dispersion medium or when preparing sodium cyclohexylamide utilizing cyclohexylamine as the dispersion medium.

Still other modifications will be apparent to those skilled in the art. For example, other conjugated polyenes such as 1,3,5-hexatriene; 1,3-pentadiene; 2,3-dimethyl-1,3-butadiene; and polyene-containing materials such as hydropolymer and the like can be used in our process in place of 1,3-butadiene with equally good results.

The sodium amides prepared by the process of our invention can be used as intermediates in the synthesis of organic compounds such as dyes and drugs, as condensation and polymerization catalysts, as metal complexing agents, and the like.

This application is a continuation-in-part of our copending application, S. N. 279,452, filed March 29, 1952, now abandoned.

It is to be understood that the above examples are given for the purpose of illustrating specific embodiments of our invention, and we intend by the appended claims to cover all modifications which fall within the spirit and scope of our invention.

We claim:

1. A process for rapidly preparing sodium amides comprising reacting in a medium in which said amide is insoluble, a dispersion of finely divided metallic sodium particles with an amine having at least one hydrogen atom bonded to an amino nitrogen atom and selected from the class consisting of alkyl amines, phenyl amines, lower alkyl-substituted phenyl amines, cyclic amines selected from the class consisting of cyclohexyl and lower alkyl substituted cyclohexyl amines and heterocyclic amines selected from the class of pyridine and piperidine amines, the sodium particles being from about 1 to 50 microns in size and constituting between about 10 and 65 percent by weight of the dispersion, the reaction mixture consisting of said sodium, said amine, a conjugated polyene hydrogen acceptor, and a diluent selected from the class consisting of inert liquid hydrocarbons and an excess of said amine, the reaction being carried out at a temperature between about 35° C. and −20° C. for a period up to about 25 minutes to form the sodium amide as a solid insoluble in the reacted mixture, and the insoluble solid product is mechanically separated from the reacted mixture.

2. The process of claim 1 wherein the sodium particles are less than 20 microns in size and the diluent is an inert liquid hydrocarbon.

3. The process of claim 1 wherein the sodium particles are less than 20 microns in size and the diluent is an excess amount of the reacting amine.

References Cited in the file of this patent

UNITED STATES PATENTS 2,141,058   Ziegler _____ Dec. 20, 1938

OTHER REFERENCES

Foster: "Inorg. Chem. for Colleges," 2nd Ed. (May 1936), p. 279.